United States Patent [19]

Lawrence

[11] Patent Number: 4,777,727

[45] Date of Patent: Oct. 18, 1988

[54] PLOTTER PEN UP/DOWN CONTROL SYSTEM

[75] Inventor: James Lawrence, Irvine, Calif.

[73] Assignee: Sanders Associates, Inc., Nashua, N.H.

[21] Appl. No.: 86,950

[22] Filed: Aug. 19, 1987

[51] Int. Cl.⁴ ............................................. G01D 15/16
[52] U.S. Cl. .................................. 33/18.1; 346/139 R
[58] Field of Search .................... 33/18.1, 1 M, 23.03; 346/139 R, 139 A, 139 B, 139 C

[56] References Cited

U.S. PATENT DOCUMENTS 3,864,695  2/1975  Nafashima ...................... 33/18.1 X
4,459,602  7/1984  Anderka ........................... 33/18.1 X Primary Examiner—Harry N. Haroian
Attorney, Agent, or Firm—Donald A. Streck; Wm F. Porter, Jr.

[57] ABSTRACT

Apparatus for accurately raising and lowering the pen and for generating a positional signal for control use in a graphics plotter having a penholding mechanism slidably and rotationally mounted on a beam for longitudinal positional movement along the beam and rotational movement around the beam to affect raising and lowering of a pen held by the penholding mechanism under the control of plotter control logic. There is an actuator rod disposed parallel to the beam for rotational movement about a longitudinal axis. A spring biases the penholding mechanism to the raised position. A ball bearing linkage is provided for smoothly and slidably linking the actuator rod to the penholding mechanism so that as the penholding mechanism is smoothly moved longitudinally along the beam, rotation of the actuator rod will cause corresponding rotation of the penholding mechanism towards the lowered position. Finally, there is powered rotation apparatus connected to the plotter control logic to receive control signals therefrom for accurately rotating the actuator rod in small increments in response to the control signals whereby the penholding mechanism can be rotated to raise and lower a pen held therein accurately in small increments. To provide the feedback signal, there is a transducer operably connected to sense rotation of the actuator rod and develop a signal at an output thereof related to the rotational position of the actuator rod.

14 Claims, 3 Drawing Sheets

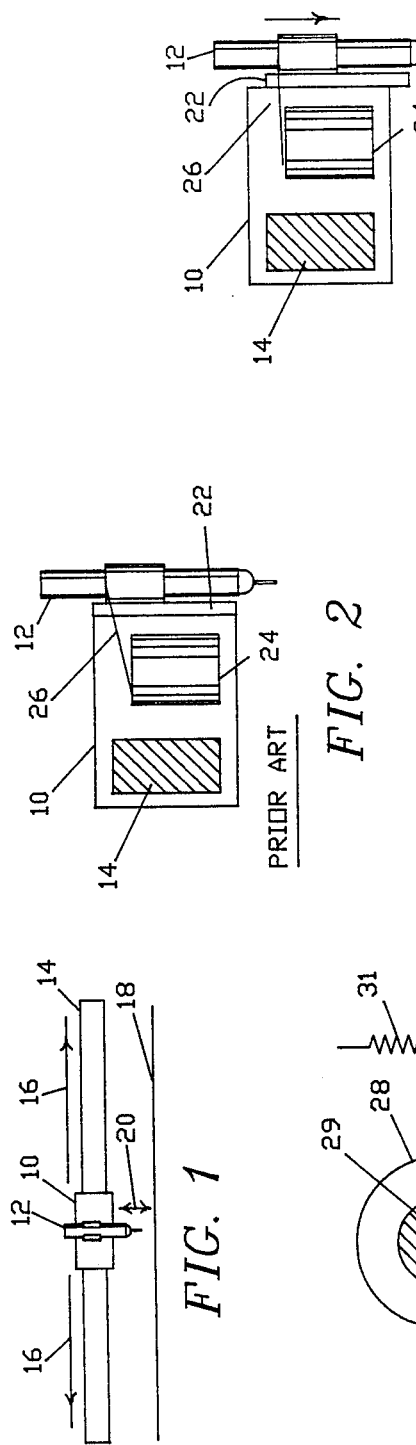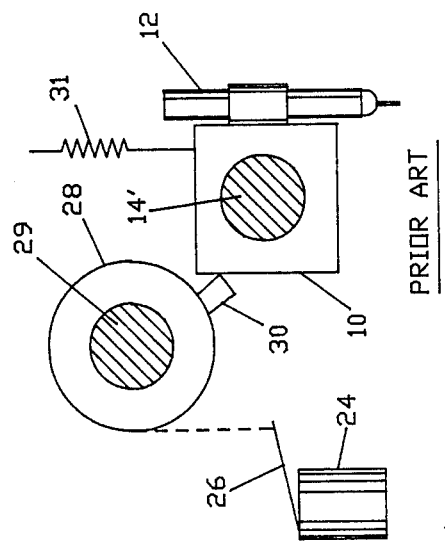

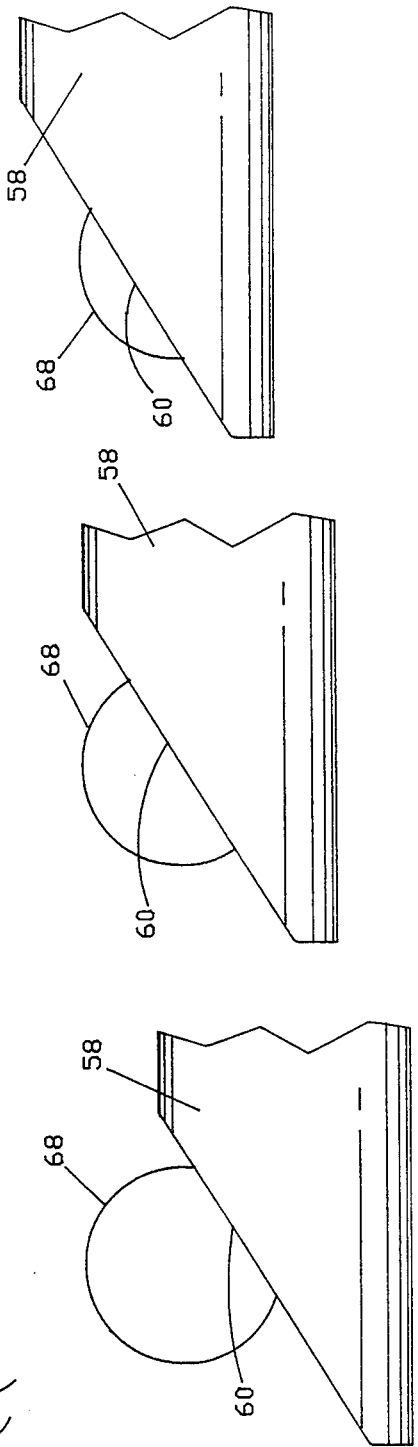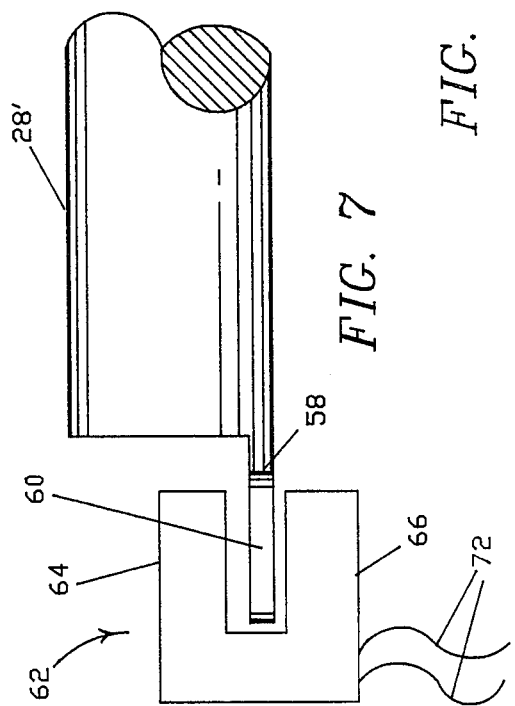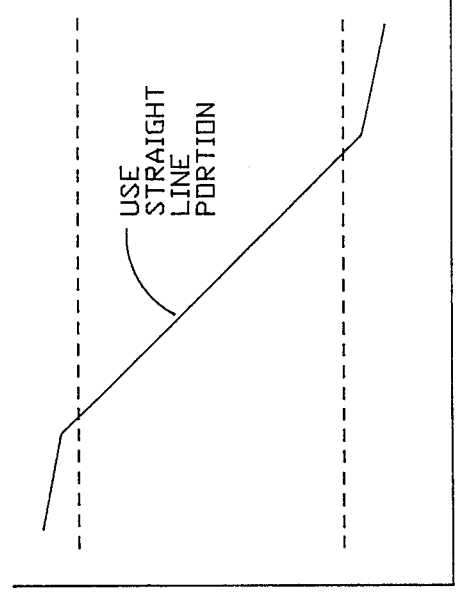

PLOTTER PEN UP/DOWN CONTROL SYSTEM

BACKGROUND OF THE INVENTION

The present invention relates to graphics plotters and, more particularly, in a graphics plotter having a penholding mechanism upwardly spring biased and slidably and rotationally mounted on a beam for longitudinal positional movement along the beam and rotational movement around the beam to affect raising and lowering of a pen held by the penholding mechanism under the control of plotter control logic, to the improvement to provide more accurate raising and lowering of the pen comprising, an actuator rod disposed parallel to the beam for rotational movement about a longitudinal axis; linkgage means for slidably linking the actuator rod to the penholding mechanism so that as the penholding mechanism is moved longitudinally along the beam rotation of the actuator rod will cause corresponding rotation of the penholding mechanism; and, powered rotation means connected to the plotter control logic to receive control signals therefrom for accurately rotating the actuator rod in small increments in response to the control signals whereby the penholding mechanism can be rotated to raise and lower a pen held therein accurately in small increments; and to the improvement for providing a feedback signal related to the rotational position of the pen comprising, transducer means operably connected to sense rotation of the actuator rod and develop a signal at an output thereof related to the rotational position of the actuator rod.

The essential elements of a graphics plotter are depicted in simplified form in FIG. 1. A penholding apparatus 10 holding a pen 12 is moved along a beam 14 from side to side as indicated by the arrows 16 over paper 18 to create one axis of the drawing while the paper 18 is moved longitudinally under the beam 14 to create the other axis. The pen 12 is raised and lowered as indicated by the arrows 20 to affect writing and non-writing movement of the pen 12. Prior art approaches to pen raising and lowering (also referred to as "dropping") fall into two general types as shown in FIGS. 2–3 and FIGS. 4–5, respectively. In the prior art technique of FIGS. 2–3, the penholding apparatus 10 is free to slide longitudinally on the beam 14 only. The pen 12 is held by a vertically slidable member 22 and biased to the raised position of FIG. 2 by a spring, or the like (not shown). A solenoid actuator 24 is connected by an armature linkage 26 to the slidable member 22. By applying an electrical current to the solenoid actuator 24, the pen 12 is lowered by sliding the member 22 vertically downward as shown in FIG. 3. When the electrical current is removed, the member 22 springs vertically upward under the bias force, taking the pen 12 with it. Thus, the mechanism of FIGS. 2–3 affects what is commonly referred to as "bang bang" control; that is, the pen 12 is banged between the two extremes of raised and lowered by the bias force and solenoid actuator 24, respectively.

The other common prior art approach to pen raising and dropping is shown in FIGS. 4 and 5 wherein the penholding apparatus 10 is both slidably and rotatably mounted on a cylindrical beam 14'. An actuator rod 28 is rotatably mounted on a bar 29 parallel to the beam 14'. The actuator rod 28 has an actuating ridge 30 extending therefrom and running longitudinally along which the penholding apparatus 10 slides as it moves along the beam 14'. As with the prior art of FIGS. 2 and 3, the penholding apparatus 10 is rotatably biased to the raised position of FIG. 4 and bearing against the actuator ridge 30 by means of a spring 31. A solenoid actuator 24 is connected by an armature linkage 26 to rotate the actuator rod 28 when energized. Thus, as shown in FIG. 5, to drop the pen 12, current is applied to the solenoid actuator 24 causing the armature linkage 26 to rotate the actuator rod 28 as indicated by the arrow 32. This, in turn, causes the actuating ridge 30 to rotate the penholding apparatus 10 about the beam 14' against the bias force of the spring 31 as indicated by the arrow 34, thus rotating the pen 12 to its dropped position. It should be noted that the rotational aspect of the pen dropping movement are exaggerated for purposes of the drawing.

There are instances wherein it would be desirable to have greater control over the pen 12 with respect to its raised and lowered position. Solenoid operation as in the above-described prior art approaches to pen control provides neither movement control nor positional feedback information.

Wherefore, it is the object of the present invention to provide apparatus for continuously controlling the up and down movement of a pen in a graphics plotter.

It is a further object of the present invention to provide positional feedback information relative to the up and down position of the pen in a graphics plotter enabling more optimum pen control to be exercised by the plotter control logic.

Additional objects and benefits of the present invention will become obvious from the description contained hereinafter taken in combination with the drawing figures which accompany it.

SUMMARY

The foregoing objects have been achieved in a graphics plotter having a penholding mechanism slidably and rotationally mounted on a beam for longitudinal positional movement along the beam and rotational movement around the beam to affect raising and lowering of a pen held by the penholding mechanism under the control of plotter control logic, by the improvement of the present invention to provide more accurate raising and lowering of the pen comprising, an actuator rod disposed parallel to the beam for rotational movement about a longitudinal axis; spring bias means biasing the penholding mechanism towards the pen raised position; linkage means for slidably linking the actuator rod to the penholding mechanism so that as the penholding mechanism is moved longitudinally along the beam rotation of the actuator rod will cause corresponding rotation of the penholding mechanism against the bias spring towards the pen lowered position; and, powered rotation means connected to the plotter control logic to receive control signals therefrom for accurately rotating the actuator rod in small increments in response to the control signals whereby the penholding mechanism can be rotated to raise and lower a pen held therein accurately in small increments.

In the preferred embodiment, there is also transducer means operably connected to sense rotation of the actuator rod and develop a signal at an output thereof related to the rotational position of the actuator rod.

The preferred powered rotation means comprises, a motor operably connected to be rotated in a direction and an amount as determined by the plotter control logic; a spur gear driven by the stepping motor; a sector gear driven by the spur gear; and, a lever arm connecting the sector gear to the actuator rod, the lever arm being positioned and of a length to place the sector gear along a circle concentric with the actuator rod.

The preferred transducer means comprises, a light emitting diode and a light sensing diode placed in opposed spaced relationship to one another to develop a signal at an output of the light sensing diode which is a function of the amount of light from the light emitting diode striking it; and, optical shutter means disposed between the light emitting diode and the light sensing diode and connected to be moved by rotation of the actuator rod for changably blocking portions of the light between the light emitting diode and the light sensing diode in relationship to rotation of the actuator rod.

DESCRIPTION OF THE DRAWINGS

FIG. 1 is a simplified view of a typical plotter pen moving mechanism.

FIG. 2 is a side view of a first prior art approach to pen raising and lowering.

FIG. 3 shows the apparatus of FIG. 2 and its manner of lowering a pen.

FIG. 4 is a side view of a second prior art approach to raising and lowering a plotter pen.

FIG. 5 shows the apparatus of FIG. 4 in the process of lowering a pen.

FIG. 7 is a top view of the portion of the present invention which develops the positional signal.

FIGS. 7-10 are simplified drawings showing the manner in which the optical shutter mechanism of the present invention progressively shades the optical sensor employed therewith to develop the positional output signal.

FIG. 11 is a graph showing the output signal from the optical sensor and the portion thereof which is employed in the present invention.

DESCRIPTION OF THE PREFERRED EMBODIMENT

Figure 6:
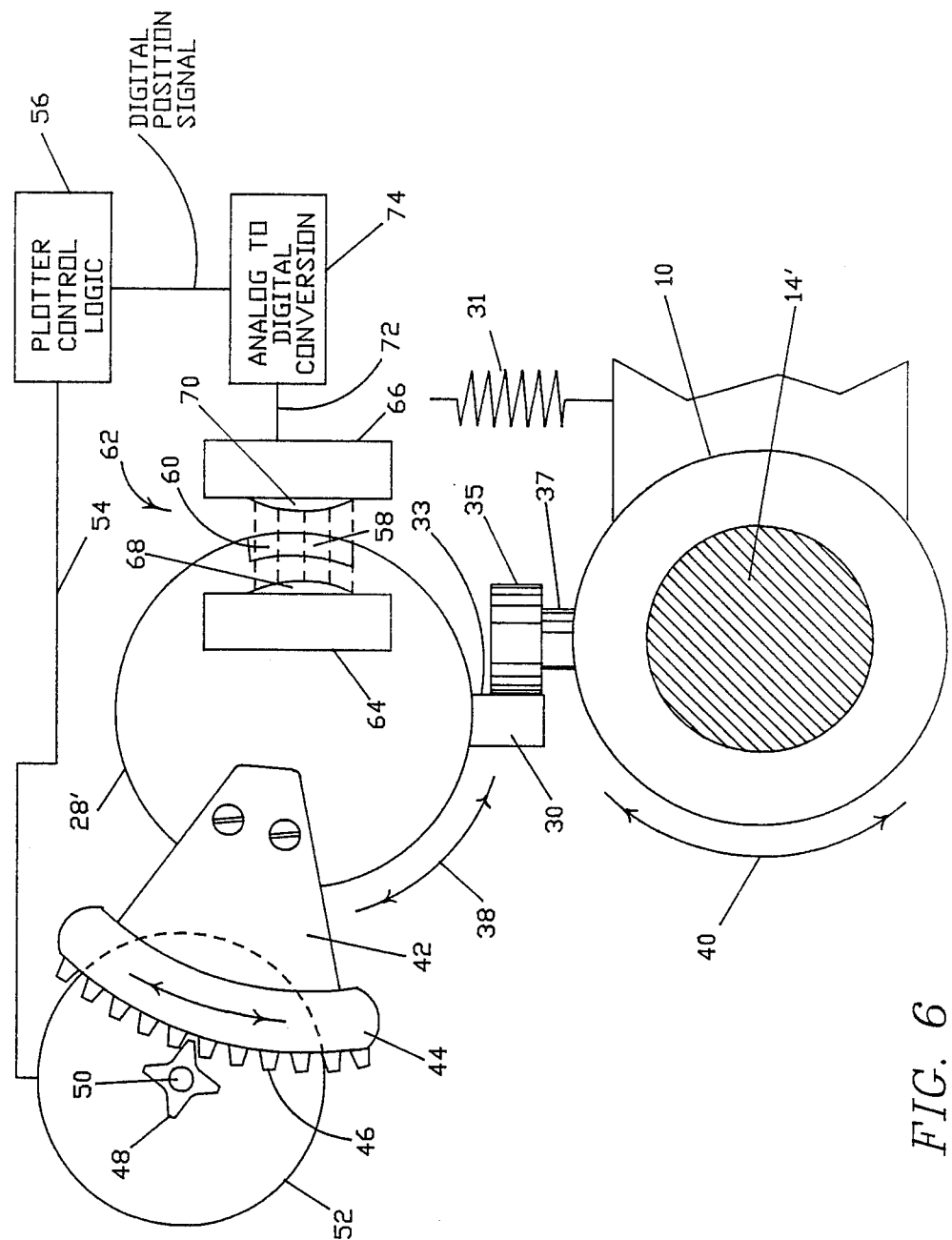
FIG. 6 is a detailed end view of the apparatus of the present invention in combination with a block diagram of the control functions combined therewith.

The present invention is a modification to the prior art approach of FIGS. 4 and 5. Accordingly, where common elements are employed, like numerical designations are employed.

As with the prior art approach of FIGS. 4 and 5, the present invention employs a penholding apparatus 10 slidably and rotatably mounted on a cylindrical beam 14'. Likewise, as with the embodiment of FIGS. 4 and 5, there is an actuator rod 28' mounted for rotation parallel to the beam 14' and having a longitudinal actuating ridge 30' extending radially outward therefrom. The ridge 30' has a planar surface 33 along one side along which a roller bearing 35 can smoothly roll. The roller bearing 35 is rotatably mounted on the end of a shaft 37 extending radially outward from the penholding apparatus 10. Again, there is the biasing spring 31 which biases the penholding apparatus 10 to the raised position. Thus, as the actuator rod 28' is rotated in either direction as indicated by the arrows 38, the penholding apparatus 10 is smoothly rotated correspondingly in the opposite direction as indicated by the arrows 40. To affect controlled rotation of the actuator rod 28', a driving arm 42 is attached to one end of the rod 28' and extends radially outward therefrom to provide a lever and extended circumference whereby large movements with small forces can be employed to affect small, accurate rotations of the actuator rod 28' with high applied force. The outer end of the driving arm terminates in a gear segment 44 having equally spaced teeth 46 on the outer periphery thereof. A small matching spur gear 48 is operably meshed with the teeth 46 of gear segment 44 and mounted on the shaft 50 of a motor 52 of a type such as those well known in the art (such as a stepping motor, or the like) which can be accurately moved in either direction by appropriate power application over line 54 from plotter control logic 56 to thereby move the gear segment 44 and actuator rod 28' in very small increments quite accurately.

To close the loop and provide positional feedback information, the actuator rod 28' has a tab 58 extending from the end adjacent the periphery thereof as best seen in FIG. 7. The tab 58 has a longitudinally angled upper surface 60 which is employed as an optical shutter mechanism with respect to an optical sensor 62 of a type also well known in the art and commercially available. As depicted in FIGS. 6 and 7, the optical sensor 62 comprises two parallel spaced arms 64, 66 containing a light emitting diode 68 and a light sensing diode 70, respectively. Sensor 62 develops a progressive signal as graphed in FIG. 11 on the output wires 72 as a function of the amount of light from the LED 68 striking the light sensing diode 70. Thus, by positioning the tab 58 so that the angled upper surface 60 moves between the LED 68 and the light sensing diode 70 as the actuator rod 28' rotates, the tab 58 acts as an optical shutter between the LED 68 and the light sensing diode 70 in the manner shown in FIGS. 8-10. As a consequence, as the actuator rod 28' rotates, the tab 58 is rotated in combination therewith and the angled upper surface 60 progressively blocks off the path of light, creating an output signal on wires 72 as in FIG. 11. The angle provides for optimum shuttering action in the presence of small rotational movement. Since adjacent the edges the output signal is erratic as shown in FIG. 11, it is preferred that movement of the angled upper surface 60 be limited to the central portions of the LED 68 and light sensing diode 70 such that the straight line portion of the output signal, as indicated in the figure, is employed.

Returning once again to FIG. 6, the output from the optical sensor 62 on wires 72 is connected as an input to an analog-to-digital converter 74. The thus digitized positional signal is input to the plotter control logic 56 to close the loop and enable the logic 56 to, in turn, control the motor 52 to raise and lower the penholding apparatus 10 in a desired manner according to the positional signal being provided by the optical sensors 62.

Wherefore, having thus described my invention, I claim:

1. In a graphics plotter having a penholding mechanism slidably and rotationally mounted on a beam for longitudinal positional movement along the beam and rotational movement around the beam to affect raising and lowering of a pen held by the penholding mechanism under the control of plotter control logic, the improvement to provide more accurate raising and lowering of the pen comprising:

(a) an actuator rod disposed parallel to the beam for rotational movement about a longitudinal axis;

(b) bias means biasing the penholding mechanism towards a pen raised position;

(c) linkage means for slidably linking said actuator rod to the penholding mechanism so that as the penholding mechanism is moved longitudinally along the beam rotation of said actuator rod will cause corresponding rotation of the penholding mechanism against the force of said bias means towards a pen lowered position; and, (d) powered rotation means connected to the plotter control logic to receive control signals therefrom for accurately rotating said actuator rod in small increments in response to said control signals whereby the penholding mechanism can be rotated to raise and lower a pen held therein accurately in small increments.

2. The improvement to a graphics plotter of claim 1 and additionally comprising:

transducer means operably connected to sense rotation of said actuator rod and develop a signal at an output thereof related to the rotational position of said actuator rod.

3. The improvement to a graphics plotter of claim 1 wherein said powered rotation means comprises:
(a) a motor operably connected to be rotated in a direction and an amount as determined by the plotter control logic;
(b) a spur gear driven by said motor;
(c) a sector gear driven by said spur gear; and,
(d) a lever arm connecting said sector gear to said actuator rod, said lever arm being positioned and of a length to place said sector gear along a circle concentric with said actuator rod.

4. The improvement to a graphics plotter of claim 2 wherein said transducer means comprises:
(a) a light emitting diode and a light sensing diode place in opposed spaced relationship to one another to develop a signal at an output of the light sensing diode which is a function of the amount of light from the light emitting diode striking it; and,
(b) optical shutter means disposed between said light emitting diode and said light sensing diode and connected to be moved by rotation of said actuator rod for changably blocking portions of the light between said light emitting diode and said light sensing diode in relationship to rotation of said actuator rod.

5. The improvement to a graphics plotter of claim 4 wherein said optical shutter means comprises:
a tab extending from one end of the periphery of said actuator rod disposed between said light emitting diode and said light sensing diode.

6. In a graphics plotter having a penholding mechanism slidably and rotationally mounted on a beam for longitudinal positional movement along the beam and rotational movement around the beam to affect raising and lowering of a pen held in the penholding mechanism under the control of plotter control logic, the improvement to provide more accurate raising and lowering of the pen comprising:
(a) an actuator rod disposed parallel to the beam for rotational movement about a longitudinal axis;
(b) bias means biasing the penholding mechanism towards a pen raised position;
(c) linkage means for slidably linking said actuator rod to the penholding mechanism so that as the penholding mechanism is moved longitudinally along the beam rotation of said actuator rod will cause corresponding rotation of the penholding mechanism against the force of said bias means towards a pen lowered position;

(d) powered rotation means connected to the plotter control logic to receive control signals therefrom for accurately rotating said actuator rod in small increments in response to said control signals whereby the penholding mechanism can be rotated to raise and lower a pen held therein accurately in small increments; and,
(e) transducer means operably connected to sense rotation of said actuator rod and develop a signal at an output thereof related to the rotational position of said actuator rod, said output being connected as in input to the plotter control logic.

7. The improvement to a graphics plotter of claim 6 wherein said powered rotation means comprises:
(a) a motor operably connected to be rotated in a direction and an amount as determined by the plotter control logic;
(b) a spur gear driven by said motor;
(c) a sector gear driven by said spur gear; and,
(d) a lever arm connecting said sector gear to said actuator rod, said lever arm being positioned and of a length to place said sector gear along a circle concentric with said actuator rod.

8. The improvement to a graphics plotter of claim 6 wherein said transducer means comprises:
(a) a light emitting diode and a light sensing diode placed in opposed spaced relationship to one another to develop a signal at an output of the light sensing diode which is a function of the amount of light from the light emitting diode striking it; and,
(b) optical shutter means disposed between said light emitting diode and said light sensing diode and connected to be moved by rotation of said actuator rod for changably blocking portions of the light between said light emitting diode and said light sensing diode in relationship to rotation of said actuator rod.

9. The improvement to a graphics plotter of claim 8 wherein said optical shutter means comprises:
a tab extending from one end of the periphery of said actuator rod disposed between said light emitting diode and said light sensing diode.

10. In a graphics plotter having a penholding mechanism slidably and rotationally mounted on a beam for longitudinal positional movement along the beam and rotational movement around the beam to affect raising and lowering of a pen held by the penholding mechanism under the control of plotter control logic, the improvement to provide more accurate raising and lowering of the pen comprising:
(a) an actuator rod disposed parallel to the beam for rotational movement about a longitudinal axis;
(b) bias means biasing the penholding mechanism towards a pen raised position;
(c) linkage means for slidably linking said actuator rod to the penholding mechanism so that as the penholding mechanism is moved longitudinally along the beam rotation of said actuator rod will cause corresponding rotation of the penholding mechanism against the force of said bias means towards a pen lowered position;
(d) powered rotation means connected to the plotter control logic to receive control signals therefrom for accurately rotating said actuator rod in small increments in response to said control signals, said powered rotation means comprising, (d1) a motor operably connected to be rotated in a direction and an amount as determined by the plotter control logic;

(d2) a spur gear driven by said motor;

(d3) a sector gear driven by said spur gear; and, (d4) a lever arm connecting said sector gear to said actuator rod, said lever arm being positioned and of a length to place said sector gear along a circle concentric with said actuator rod; and, (e) transducer means operably connected to sense rotation of said actuator rod and develop a signal at an output thereof related to the rotational position of said actuator rod, said output being connected as in input to the plotter control logic.

11. The improvement to a graphics plotter of claim 10 wherein said transducer means comprises:

(a) a light emitting diode and a light sensing diode placed in opposed spaced relationship to one another to develop a signal at an output of the light sensing diode which is a function of the amount of light from the light emitting diode striking it; and, (b) optical shutter means disposed between said light emitting diode and said light sensing diode and connected to be moved by rotation of said actuator rod for changably blocking portions of the light between said light emitting diode and said light sensing diode in relationship to rotation of said actuator rod.

12. The improvement to a graphics plotter of claim 11 wherein said optical shutter means comprises:

a tab extending from one end of the periphery of said actuator rod disposed between said light emitting diode and said light sensing diode.

13. In a graphics plotter having a penholding mechanism slidably and rotationally mounted on a beam for longitudinal positional movement along the beam and rotational movement around the beam to affect raising and lowering of a pen held by the penholding mechanism under the control of plotter control logic, the improvement to provide more accurate raising and lowering of the pen comprising:

(a) an actuator rod disposed parallel to the beam for rotational movement about a longitudinal axis;

(b) bias means biasing the penholding mechanism towards a pen raised position;

(c) linkage means for slidably linking said actuator rod to the penholding mechanism so that as the penholding mechanism is moved longitudinally along the beam rotation of said actuator rod will cause corresponding rotation of the penholding mechanism against the force of said bias means towards a pen lowered position;

(d) powered rotation means connected to the plotter control logic to receive control signals therefrom for accurately rotating said actuator rod in small increments in response to said control signals, said powered rotation means comprising, (d1) a motor operably connected to be rotated in a direction and an amount as determined by the plotter control logic;

(d2) a spur gear driven by said motor;

(d3) a sector gear driven by said spur gear; and, (d4) a lever arm connecting said sector gear to said actuator rod, said lever arm being positioned and of a length to place said sector gear along a circle concentric with said actuator rod; and, (e) transducer means operably connected to sense rotation of said actuator rod and develop a signal at an output thereof connected as in input to the plotter control logic and related to the rotational position of said actuator rod, said transducer means comprising, (e1) a light emitting diode and a light sensing diode placed in opposed spaced rlationship to one another to develop a signal at an output of the light sensing diode which is a function of the amount of light from the light emitting diode striking it; and, (e2) optical shutter means disposed between said light emitting diode and said light sensing diode and connected to be moved by rotation of said actuator rod for changably blocking portions of the light between said light emitting diode and said light sensing diode in relationship to rotation of said actuator rod.

14. The improvement to a graphics plotter of claim 13 wherein said optical shutter means comprises:

a tab extending from one end of the periphery of said actuator rod disposed between said light emitting diode and said light sensing diode.

* * * * *